US012766977B2

(12) United States Patent
Lister et al.

(10) Patent No.: US 12,766,977 B2
(45) Date of Patent: Oct. 20, 2026

(54) SYSTEMS AND METHODS FOR CONTROL OF DISSIPATION DEVICES

(71) Applicant: Caterpillar Inc., Peoria, IL (US)

(72) Inventors: Brian Eugene Lister, Edwards, IL (US); Sufiyan Ahmed, Peoria, IL (US); Royce E Leaders, Oswego, IL (US)

(73) Assignee: Caterpillar Inc., Peoria, IL (US)

( * ) Notice: Subject to any disclaimer, the term of this patent is extended or adjusted under 35 U.S.C. 154(b) by 78 days.

(21) Appl. No.: 18/642,697

(22) Filed: Apr. 22, 2024

(65) Prior Publication Data

US 2025/0326300 A1 Oct. 23, 2025

(51) Int. Cl.

| | |
|---|---|
| ***B60L 15/20*** | (2006.01) |
| ***B60L 1/00*** | (2006.01) |
| ***B60L 7/10*** | (2006.01) |
| ***B60L 58/15*** | (2019.01) |
| ***H02P 23/00*** | (2016.01) |

(52) U.S. Cl.

CPC ........... *B60L 15/2018* (2013.01); *B60L 1/003* (2013.01); *B60L 7/10* (2013.01); *B60L 58/15* (2019.02); *H02P 23/0004* (2013.01); *B60L 2200/40* (2013.01); *B60L 2240/32* (2013.01); *B60L 2240/642* (2013.01)

(58) Field of Classification Search

CPC ........ B60L 15/2018; B60L 1/003; B60L 7/10; B60L 58/15; B60L 2200/40; B60L 2240/32; B60L 2240/642; H02P 23/0004

See application file for complete search history.

(56) References Cited

U.S. PATENT DOCUMENTS

| | | | | |
|---|---|---|---|---|
| 8,386,131 | B2 | 2/2013 | Thaduvayi et al. | |
| 9,366,012 | B2 | 6/2016 | Moriki et al. | |
| 9,765,500 | B2 | 9/2017 | Miyamoto et al. | |
| 2011/0260659 | A1* | 10/2011 | Kamachi | B60L 15/2009 318/139 |
| 2016/0251828 | A1 | 9/2016 | Miyamoto et al. | |
| 2019/0176827 | A1 | 6/2019 | Han et al. | |
| 2023/0054823 | A1* | 2/2023 | David | B60L 15/2045 |
| 2023/0166601 | A1 | 6/2023 | Schneider et al. | |
| 2024/0059153 | A1* | 2/2024 | Rahm | B60T 17/006 |
| 2024/0140259 | A1* | 5/2024 | Cox | B60L 7/10 |

FOREIGN PATENT DOCUMENTS

| | | |
|---|---|---|
| CN | 114872680 A | 8/2022 |

OTHER PUBLICATIONS

Written Opinion and International Search Report for Int'l. Patent Appln. No. PCT/US2025/022863, mailed Jul. 9, 2025 (15 pgs).

* cited by examiner

*Primary Examiner* — Kyle J Kingsland

(74) *Attorney, Agent, or Firm* — Lee & Hayes, PLLC

(57) ABSTRACT

This disclosure describes a feed forward control system for engaging a dissipative energy system for dissipating energy produced by a motor of an electrically-powered machine as a result of deceleration of the machine, for example to decelerate and execute a directional change for the machine. The control system includes a feed forward system that engages based on an input signal to spool up and power-on a dissipative energy system of the machine such that as energy is produced, the energy may be divided between the dissipative system and the charging system of the machine. The feed forward controller operates based on a function of a charging current limit of the battery, inversely proportional to the charging current limit.

20 Claims, 5 Drawing Sheets

SYSTEMS AND METHODS FOR CONTROL OF DISSIPATION DEVICES

TECHNICAL FIELD

The present application relates generally to electrically-powered machines, and more particularly to systems and methods for controlling a dissipation or storage device of the electrically-powered machine when using motor current to slow the electrically-powered machine in response to a request for directional change and/or descending a slope.

BACKGROUND

Electrification of heavy-duty and/or offroad systems in large-scale construction equipment and hauling vehicles has grown rapidly in the recent years. Electrically driven machines may be designed to provide combinations of electric and/or internal combustion power to the machines' drivetrain. Machines increasingly use electric drive systems to provide propulsion for the machine. For example, passenger vehicles may use a hybrid drive system in which a traditional gasoline powered engine and an electric motor are both used to provide propulsion for the vehicle. Machines, such as, for example, off-highway vehicles, may use a diesel-powered engine to drive a generator, which provides electric power to an electric motor. The electric motor is typically configured to provide propulsion for the machine by driving the wheels or travel mechanisms of the machine.

In addition, braking systems may take advantage of components in electric drive systems, including the electric motor, to provide braking for machines. Electric drive machines may require the use of systems for controlling the power produced by the electric motor and/or the engine. Conventional control systems for electric drive machines use various machine operating conditions and parameters to adjust the operations of the machine's motor to increase the performance efficiency of the machine. For example, the control system may allow an operator to interface with the electric drive machine to perform various machine operations, including driving the machine in forward and reverse driving directions.

In certain situations, the operators operating the electric drive machine may desire to change the driving direction of the machine when in motion. For example, the operator may want to change the driving direction of the electric drive machine moving in reverse to forward. In some circumstances, the operator may want to change directions relatively quickly. The electric drive system, however, encounters problems when attempting to change the driving or propulsion direction of the machine if the power required to change the direction of the machine is too high. For example, attempting to change the driving direction before the power required to change the driving direction is appropriately low may lead to comparatively high currents passing through the electric drive system, which may damage some of the electric drive components. To overcome this problem, the operator may have to engage the brake system, for example, by depressing a service brake pedal, wait for the machine to stop, then engage an accelerator pedal while releasing the service brake pedal.

Existing systems may provide control systems for a method to change a driving direction of a vehicle in motion, and particularly relate to a sequence of braking to be applied when changing a vehicle direction. One such system is described in U.S. Pat. No. 9,765,500 to Shunsuke (hereinafter "the '500 patent"). The '500 patent provides for an energy management system of a vehicle that has "an energy management determination unit" that "determines, on the basis of the difference between a target electricity storage amount and a current electricity storage amount in the energy storage unit, the energy management required power required by the power transmission device for charging the energy storage unit." The '500 patent further describes that "the energy management requirement determination unit increases the target electricity storage amount" when an operator changes a travel direction switch.

Although the '500 patent describes a system for managing electrical current produced by a motor during a directional change, the '500 patent provides that "the electricity received during the deceleration is quickly used during the subsequent acceleration." However, the '500 patent does not address a delay in the response of a charging system to the electrical load as a result of the motor braking and/or the need to prevent overcharging in instances where the deceleration produces energy in excess of the current limits of the charging system of the vehicle.

Examples of the present disclosure are directed toward overcoming the deficiencies described above.

SUMMARY OF THE INVENTION

In some examples, the systems described herein may provide an electric drive work machine that has an electric motor and an energy storage device configured to provide power to the electric motor. The machine may also include a load system such as a parasitic load, auxiliary energy storage, or energy dissipation system configured to receive power produced by the electric motor. The machine may also include a sensor system. The machine also includes a controller including a processor and a non-transitory computer-readable medium having instructions stored thereon that, when executed by the processor, cause the processor to perform operations. The operations may include determining, based on sensor data from the sensor system, to decelerate the electric drive work machine using the electric motor, determining a charging current limit for the energy storage device, and activating a feed forward signal in response the determining to decelerate the electric drive work machine and based on the charging current limit, where the feed forward signal is configured to control, at least in part, operation of the load system.

In some examples, the techniques described herein may provide a method for controlling a work machine. The method includes determining, based on sensor data from a sensor system, to decelerate the work machine using, at least in part, an electric motor of the work machine. The method also includes controlling, using a control loop, a load system to dissipate or store at least a portion of energy produced by the electric motor during deceleration. The method further includes determining a charging current limit for a battery of the work machine and activating a feed forward signal in response the determining to decelerate the work machine, the feed forward signal based on the charging current limit and configured to control, at least in part, operation of the load system.

In some implementations, the sensor system may include a sensor configured to detect a user input associated with a directional change of the electric drive work machine. The sensor system may also include a grade sensor configured to detect a grade traversed by the electric drive work machine. The controller may include a Proportional-Integral-Derivative ("PID") controller configured to operate the load system for dissipation or storage of energy produced by the electric motor during deceleration, and the feed forward signal is added to an output control signal of the PID controller. The sensor system may also include map data of a worksite and location data of the electric drive work machine, and determining to decelerate may be based at least in part on the map data and the location data. The feed forward signal may be a function of the charging current limit of the energy storage device. The load system may include at least one of a fluid pump, hydraulic pump, secondary energy storage system, or dissipative energy system.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Wherever possible, the same reference numbers will be used throughout the drawings to refer to the same or like parts. In the figures, the left-most digit(s) of a reference number identifies the figure in which the reference number first appears.

Figure 1:
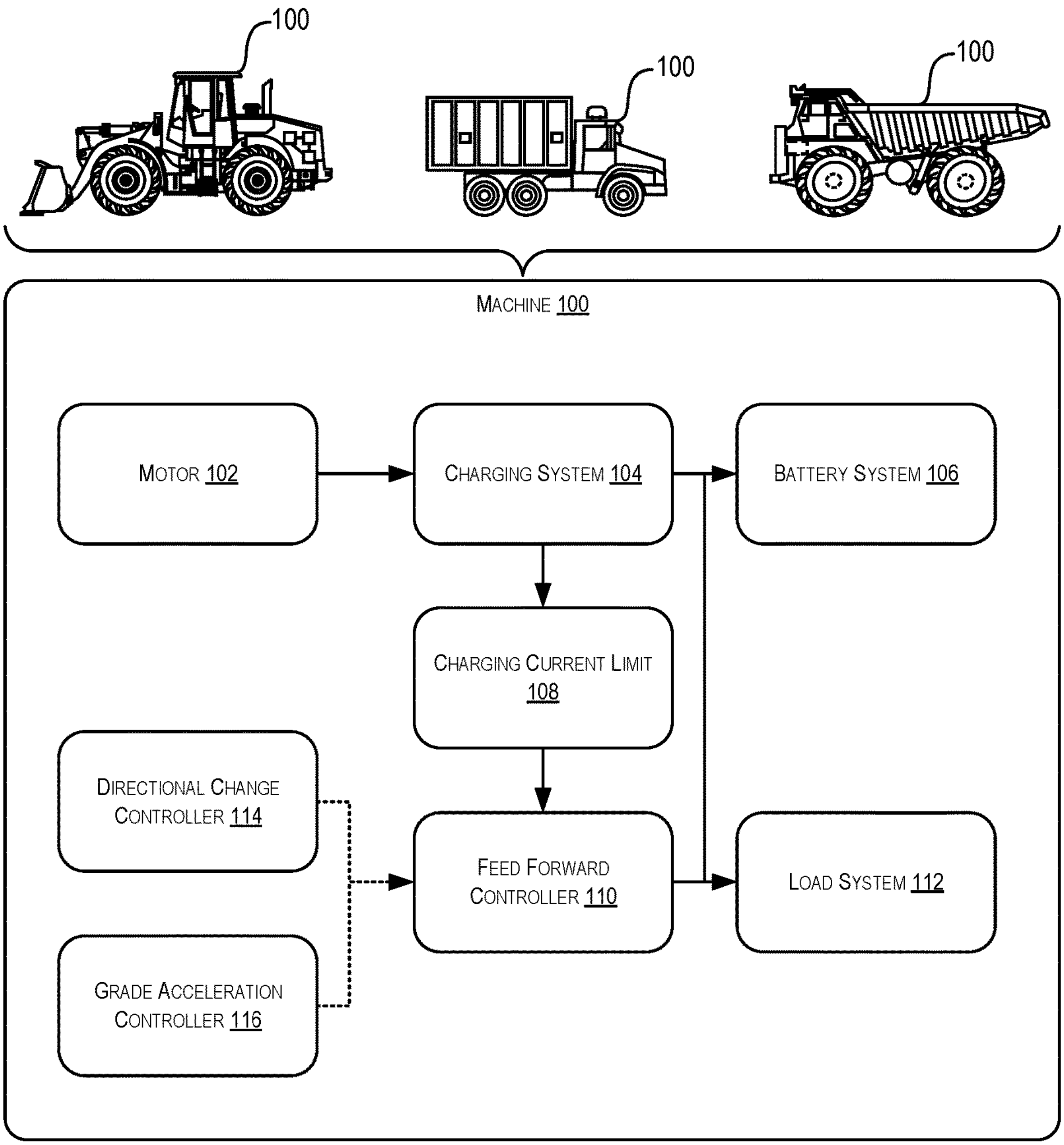
FIG. 1 illustrates a machine with an electrically-powered drivetrain and a controller for providing energy diversion during a deceleration of the machine, according to at least one example.

FIG. 1 illustrates a machine 100 with an electrically-powered drivetrain and a controller for providing energy diversion during a deceleration of the machine 100, according to at least one example. The machine 100 can be a mobile machine or vehicle that includes one or more electrical systems such as a motor 102 configured to be powered by a battery system 106 and/or other sources of power. For example, the machine 100 can be a battery electric machine (BEM), a battery electric vehicle (BEV), a hybrid vehicle, a fuel cell and battery hybrid vehicle, or another mobile machine. The battery system 106 may include primary systems and auxiliary systems.

The machine 100 can, in some examples, be a commercial or work machine, such as a mining machine, earth-moving machine, backhoe, scraper, dozer, loader (e.g., large wheel loader, track-type loader, etc.), shovel, truck (e.g., mining truck, haul truck, on-highway truck, off-highway truck, articulated truck, etc.), a crane, a pipe layer, farming equipment, or any other type of mobile machine or vehicle. The machine 100 may operate at, and/or travel around, a worksite, such as a mine site, a quarry, a construction site, or any other type of worksite or work environment. In some examples, the machine 100 can have one or more work tools, such as a bucket, scraper, ripper, blade, pusher, fork, grapple, plow, or other type of work tool. The machine 100 can accordingly be configured to move and/or use one or more types of work tools to interact with rocks, gravel, dirt, sand, lumber, construction material, and/or any other type of material on a worksite. As an example, the machine 100 can be a haul truck that moves material around a worksite. In other examples, the machine 100 can be an electric automobile or other type of mobile machine used for personal transportation, commercial transportation, or other purposes, such as an electric vehicle configured to travel on public and/or private roads.

The machine 100 can be a staffed machine, a semi-autonomous machine, or an autonomous machine. In examples in which the machine 100 is a staffed machine or a semi-autonomous machine, a human operator or driver can operate, control, or direct some or all of the functions of the machine 100. However, in examples in which the machine 100 is autonomous or semi-autonomous, functions of the machine 100, such as steering, speed adjustments, and/or other functions can be fully or partially controlled, automatically or semi-automatically, by on-board and/or off board controllers or other computing devices associated with the machine 100. As an example, the machine 100 can have an electronic control module (ECM) and/or other on-board computing devices that can fully or partially control operations of the machine 100. For instance, the machine 100 can have an on-board guidance system that can drive the machine 100 autonomously, an obstacle detection system that assists the on-board guidance system or can alert a human operator of nearby objects detected by the obstacle detection system, and/or other systems that fully or partially control operations of the machine 100. As another example, an off-board computing device can receive data from the machine 100 and return instructions to the machine 100 to dispatch the machine 100 to autonomously travel along a defined and/or assigned route, or to fully or partially control operations of the machine 100 remotely.

The machine 100 can have one or more sensors such as cameras, LIDAR sensors, RADAR sensors, other optical sensors or perception systems, Global Positioning System GPS) sensors, and other location and/or positioning sensors, payload sensors, speed sensors, brake temperature sensors, other temperature sensors, tire pressure sensors, battery state of health (SoH) sensors, incline and decline travel sensors, directional shift/change sensors, and/or other types of sensors. One or more of the sensors can provide data to a controller of the machine 100 for one or more operations, as described herein.

The machine 100 is driven by a motor 102 such as a direct-current (DC) or alternating current (AC) motor that receives power from a battery system 106. The battery system 106 is charged by a charging system 104 of the machine 100, and in some examples, such as when using regenerative braking (e.g., motor braking), the motor 102 may be used as a generator to provide power to the charging system 104 and be used to charge the battery system 106.

The battery system 106 of the machine 100 can include one or more batteries, such as lithium-ion (Li-ion) batteries, lithium-ion polymer batteries, nickel-metal hydride (NiMH) batteries, lead-acid batteries, nickel cadmium (Ni—Cd) batteries, zinc-air batteries, sodium-nickel chloride batteries, or other types of batteries. In some examples, multiple battery cells can be grouped together, in series or in parallel, within a battery module. Multiple battery modules can also be grouped together, for instance in series, within a battery string. One or more battery, strings can be provided within a battery pack, such as a group of battery strings linked together in parallel. Accordingly, the battery system 106 can include one or more battery packs, battery strings, battery modules, and/or battery cells.

In some examples, the motor 102 may be used for a braking operation (e.g., deceleration) that applies braking torque to slow the speed of the machine 100 from a current speed to a lower speed, and/or to stop the machine 100. In other examples, the braking operation can be a retarding operation that applies braking torque to maintain a current speed of the machine 100. For instance, if the machine 100 is traveling downhill and might otherwise accelerate downhill, the motor 102 can operate to prevent acceleration and thereby maintain the current speed of the machine 100. In some examples, the battery system 106 may not be able to accept current from the motor 102 as the motor 102 is used to produce power to slow the machine 100 on the grade.

In some examples, the machine 100 may perform a directional change when a user requests a change from a first direction to a second direction while traveling at high speed in the first direction. To execute a directional change the powertrain of the machine 100 must first decelerate the machine 100 to zero speed in the first direction by reducing the machine's kinetic energy, either via energy dissipation through mechanisms such as brakes and hydraulic retarders or through energy transfer to energy storage devices such as flywheels or batteries. The machine 100 may have a minimum rate of power transfer/dissipation. In an electric drive work machine, the rate of power transfer may depend upon the charging current rate limit of the system. As used herein, brakes may refer to regenerative brake systems, resistive brake systems, motor torques used for braking, mechanical brake systems, and other such braking systems.

As the state of charge (SOC) of the battery system increases, the charging current limit 108 decreases, requiring the activation of retarding devices mid-deceleration to maintain a consistent magnitude of retarding force (deceleration) felt by the operator. In some examples other factors may affect the charging current limit 108 such as the battery temperature, ambient temperature, and other such factors.

In either example, preventing acceleration down a grade or slowing the machine 100 from a speed in a first direction to zero, or other examples where deceleration of the machine 100 is desired, typical mechanical dissipation (e.g., retarding) devices, referred to herein as load system 112, may have long response times to generate the required level of energy dissipation, creating a delay or interruption in the retarding force that results in an inconsistent deceleration and/or directional change experience for the operator.

The load system 112 may include other types of electrically-powered systems, such as heaters, coolers, fans, hydraulic pumps, hydraulic accumulators, accessory pumps, pumps associated with pressure regulating valves, charge and/or discharge accumulators, electric motors, electric converters, other electrical systems. In some examples, one or more types of load systems 112 can have accumulators, capacitors, springs, and/or other elements capable of at least temporarily storing received energy.

Accordingly, the system and method described herein provides for energy storage at the battery system 106 when performing deceleration and/or a directional changes as well as dissipation or secondary storage devices without resulting in delays for secondary systems to activate. This also ensures that the charging current limit 108 isn't exceeded, preventing overheating and potential damage to the charging system 104 and/or battery system 106.

To reduce the effects of the load system 112 delay, the machine 100 uses a feed forward controller 110 added to the control loop for the load system 112. The feed forward controller 110 may be triggered in response to a directional change controller 114 and/or a grade acceleration controller 116 and/or other such system. The directional change controller 114 provides a signal to activate the feed forward controller 110 when the directional change is requested. The grade acceleration controller 116 likewise provides an activation signal when the machine 100 is determined to be on a grade that may cause acceleration of the machine 100.

The feed forward controller 110 is a controller that passes a control signal in response to sensor inputs or other inputs, such as the directional change, grade traversed by the machine 100, or other such systems. The feed forward controller responds to the control signal in a pre-defined manner without responding to the way the system reacts (e.g., without feedback). Accordingly, the feed forward controller 110 may be activated and begin providing a control signal to the load system based on a pre-defined function based on the charging current limit 108.

In some examples, when the feed forward controller 110 is activated, then the feed forward command from the feed forward controller 110 is a function of the charging current limit 108 for the charging system 104. In some examples, the function is an inverse relationship such that a low charging current limit results in a high feed forward command to the load system 112. Accordingly, the feed forward controller 110 may be used to activate the load system earlier than for controls without a feed forward aspect, allowing the load system 112 time to respond (e.g., startup, spool up, or otherwise begin operation) such that the power consumed by the load system may be provided seamlessly as-needed.

While the feed forward controller 110 may minimally increase an amount of dissipated energy consumed by the load system 112 and therefore not provided to the charging system 104 and/or battery system 106, the decrease in the amount of stored energy is a result of an already high SOC, and thus recharging the battery system 106 may be a lower priority and/or the battery system 106 may be unable to accept charging current which is therefore restricting the ability to store energy.

Figure 2:
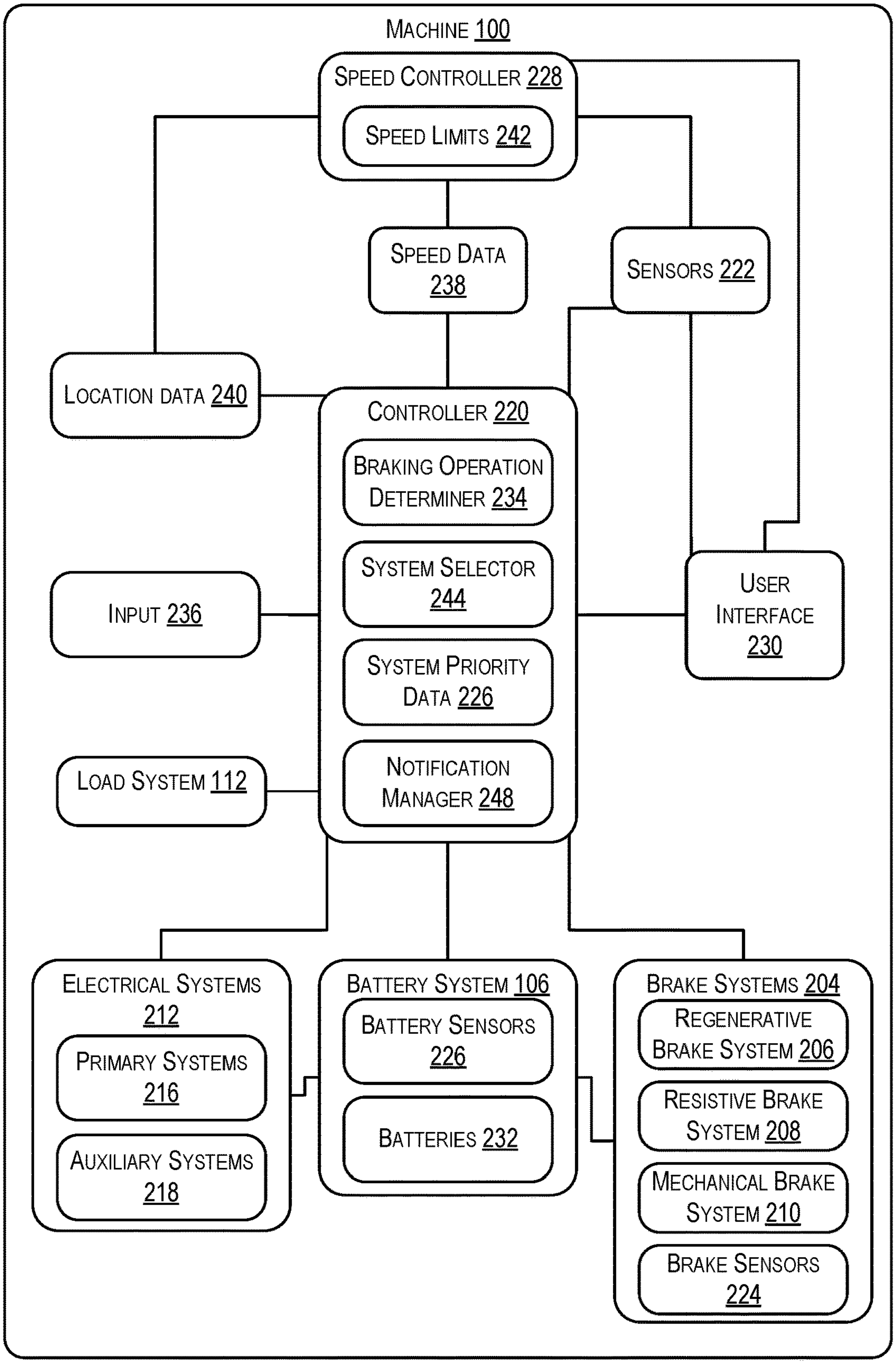
FIG. 2 illustrates an example control system for a machine that includes a controller to engage a load system during machine deceleration, according to at least one example.

FIG. 2 illustrates an example control system for a machine 100 that includes a controller 220 to engage a load system during machine deceleration, according to at least one example. The machine 100 may include systems such as the battery system 106 and load system 112 as described in FIG. 1 and further includes brake systems 204, electrical systems 212, controller 220, sensors 222, speed controller 228, user interface 230, input 236, and location data 240.

The brake systems 204 can include a regenerative brake system 206, a resistive brake system 208, and/or a mechanical brake system 210. The machine 100 can be a mobile machine or vehicle that includes one or more electrical systems 212 configured to be powered by a battery system 106, the regenerative brake system 206, and/or other sources of power. For example, the machine 100 can be a battery electric machine (BEM), a battery electric vehicle (BEV), a hybrid vehicle, a fuel cell and battery hybrid vehicle, or another mobile machine. The electrical systems 212 can include primary systems 216 and auxiliary systems 218. In some examples, the brake systems 204 may include a regenerative brake system 206 that can capture energy when the machine 100 performs a braking operation, and the captured energy can be associated with an amount of brake power and may also include a resistive brake system 208, mechanical brake system 210, and brake temperature sensors 224. The controller 220 may be used to determine which of the brake systems 204 and/or load system 112 (in connection with the electrical systems 212) to invoke for a particular braking operation, and/or how to distribute energy associated with the brake power of the braking operation among one or more of the brake systems 204, the battery system 214, one or more of the load system 112 and/or auxiliary systems 218, and/or other systems.

The machine 100 can include electrical systems 212, including primary systems 216 and auxiliary systems 218 that are configured to operate using energy provided by the battery system 106 and/or the regenerative brake system 206. The primary systems 216 can include electric engines, electric motors, electrical conversion systems, electric drive-trains, and/or other electrical components that are configured to convert and/or use energy to cause overall propulsion or movement of the machine 100, power movement and/or other operations of work tools associated with the machine 100, and/or otherwise power primary operations of the machine 100.

The auxiliary systems 218 and/or load system 112 can include other types of electrically-powered systems and/or mechanical systems, such as such as heaters, coolers, fans, hydraulic pumps, hydraulic accumulators, accessory pumps, pumps associated with pressure regulating valves, charge and/or discharge accumulators, electric motors, electric converters, other electrical systems and accessories. In some examples, one or more types of auxiliary systems 218 can have accumulators, capacitors, springs, and/or other elements capable of at least temporarily storing received energy. As discussed below, in some examples the controller 220 can activate one or more of the auxiliary systems 218 as parasitic systems to receive, store, and/or consume energy during situations in which those auxiliary systems 218 might otherwise be inactive.

The machine 100 can have one or more sensors 222. The sensors 222 can include cameras, LIDAR sensors, RADAR sensors, other optical sensors or perception systems, Global Positioning System GPS) sensors, other location and/or positioning sensors, payload sensors, speed sensors, brake temperature sensors 224, other temperature sensors, tire pressure sensors, battery state of health (SoH) sensors 226, incline and decline travel sensors, and/or other types of sensors. One or more of the sensors 222 can provide data to the controller 220, a speed controller 228, a separate ECM of the machine 100, and/or off-board computing systems, such that sensor data can be used to determine a location of the machine 100, detect nearby terrain, detect nearby objects, such as vehicles, other machines, or personnel, detect the positions of such nearby objects relative to the machine 100, determine a weight of a payload carried by the machine 100, determine a SoC of the battery system 214, and/or perform other operations. In some examples, data provided by the sensors 222 can enable the machine 100 to drive and/or operate autonomously or semi-autonomously. Data associated with one or more of the sensors 222 can also be provided to a driver or other operator of the machine 100 via a user interface 230, for example via dashboard indicator lights, screens, or other displays.

In some examples, a braking operation can be a deceleration operation that applies braking torque to slow the speed of the machine 100 from a current speed to a lower speed, and/or to stop the machine 100 for a directional change or other purpose. In other examples, the braking operation can be a retarding operation that applies braking torque to maintain a current speed of the machine 100. For instance, if the machine 100 is traveling downhill and might otherwise accelerate downhill, the one or more of the electrical systems 212 and/or brake systems 204 can operate to prevent acceleration and thereby maintain the current speed of the machine 100.

The regenerative brake system 206 can be configured to capture kinetic energy and/or potential energy during braking operations of the machine 100. In some examples, energy captured by the regenerative brake system 206 can be stored in the battery system 214, and thereby charge one or more batteries 232 of the battery system 214. In other examples, energy captured by the regenerative brake system 206 can be used to directly power one or more electrical systems 212, such as one or more of the auxiliary systems 218, instead of or in addition to using the energy to charge the battery system 214. As described further below, energy captured by the regenerative brake system 206 can also be allocated to one or more other systems of the machine 100.

The resistive brake system 208 can be a dynamic braking system that is also configured to capture kinetic energy and/or potential energy during braking operations of the machine 100, and/or is configured to receive energy captured by the regenerative brake system 206. The resistive brake system 208 can include one or more resisters, such that the resistive brake system 208 can dissipate captured energy as heat in the resisters. For example, the resistive brake system 208 can include a resistive grid with a coil that can conduct electricity while blowers blow air across the coil. Such a resistive coil can consume energy by converting the energy to heat.

The mechanical brake system 210 can include mechanical components, such as mechanical elements configured to apply brake pads against rotors, or to apply brake disks against plates through a piston, to frictionally slow down wheels of the machine 100. The mechanical brake system 210 can be a service brake system, such as a hydraulic braking system or other mechanical braking system.

The brake temperature sensors 224 can be configured to determine temperatures associated with the regenerative brake system 206, the resistive brake system 208, and/or the mechanical brake system 210, and provide corresponding temperature data to the controller 220. For example, as the mechanical brake system 210 applies brake pads against rotors to frictionally slow down wheels of the machine 100, heat generated by the friction can increase a temperature associated with the mechanical brake system 210. The brake temperature sensors 224 can accordingly provide temperature data indicating a temperature of the mechanical brake system 210 to the controller 220. The controller 220 may be used to determine the use of brake systems 204, electrical systems 212, and load system 112 to use to slow (e.g., decelerate) and/or prevent acceleration of the machine 100.

The controller 220 can have a braking operation determiner 234 configured to identify a braking operation that is occurring or will occur, and to determine brake power associated with the braking operation. The braking operation determiner 234 can identify a braking operation, and/or brake power associated with the braking operation, based on input 236, speed data 238 received from a speed controller 228, location data 240, feedback provided by the electrical systems 212, the battery system 214, and/or the brake systems 204, and/or other factors.

In some examples, the input 236 may include an input directing a directional change of the machine 100. The driver may indicate the directional change and may also press a brake pedal, release an accelerator pedal, move levers, press buttons, and/or otherwise provide user input indicating a desire to slow down the machine 100 based on an indicated deceleration rate, to maintain a current speed of the machine 100, or to adjust the speed of the machine 100 to a specified speed. The braking operation determiner 234 can accordingly determine that a user has requested a braking operation based on input 236. As described herein, the controller 220 can implement the braking operation in part by determining one or more systems of the machine 100 to invoke during the braking operation. Additionally, the controller 220 can implement additional control systems, such as the feed forward controller 110 of FIG. 1, to implement the load system and/or auxiliary systems 218 to store and/or dissipate energy produced during deceleration of the machine 100.

In some examples, the speed controller 228 can be configured with speed limits 242 that indicate maximum or recommended speeds for the machine 100 based on temperatures of the brake systems 204, a location of the machine 100 on a worksite or other area, incline or decline angles of terrain being traveled by the machine 100, a weight of a payload being carried by the machine 100, and/or other factors. For instance, if the brake temperature sensors 224 indicate that a temperature of the mechanical brake system 210 exceeds a defined temperature threshold, the speed limits 242 can indicate that the current speed of the machine 100 should be reduced to a lower speed. Accordingly, if the machine 100 is traveling at, or accelerating to, a speed that exceeds a speed limit defined by the speed limits 242, the speed controller 228 can provide speed data 238 to the controller 220 that requests deceleration of the machine 100 or that limits speeds and/or acceleration requested by a user.

As another example, the speed data 238 can be based on an automated braking command generated by the speed controller 228 or received by the speed controller 228 from another source, such as the ECM of the machine 100 or an off-board computing device. The automated braking command can request that the machine 100 perform a braking operation based on an autonomous machine command, an off-board instruction to slow the machine 100 or maintain a speed of the machine 100, an automatic detection of a nearby obstacle, a cruise control setting to maintain a set speed of the machine 100, or any other condition that triggers an automatic braking operation of the machine 100.

In still other examples, the braking operation determiner 234 can predict an upcoming braking operation of the machine 100, or otherwise determine a braking operation that the machine 100 is to perform at a future time or at a particular location. The braking operation determiner 234 can predict or determine an upcoming braking operation of the machine 100 based on the location data 240, historical data associated with braking operations, work cycles, or other operations previously performed by the machine 100 or similar machines, and/or other data.

The location data 240 can indicate terrain of a worksite or other area, locations and/or identities of obstacles, the location of the machine 100, locations of roads or other routes, ground types and/or ground conditions, and/or other information. For instance, the location data 240 can indicate positions of fixed and/or movable obstacles on the worksite, such as other machines, personnel, lakes, ponds, rivers, cliff faces, hills, roads, intersections, mounds of dirt, gravel, or other material, and/or other types of objects, terrain features, or obstacles. The location data 240 can also indicate grades or slopes of the terrain, such as incline levels or decline levels associated with portions of a worksite. In some examples, the location data 240 can be a predetermined map of the worksite or other area. In other examples, the machine 100 itself can generate the location data 240 based on terrain slopes, machine travel headings, grid coordinates, other geographical coordinates, and/or other data detected by the machine 100 in association with paths previously traversed by the machine 100 through the area covered by the location data 240.

The braking operation determiner 234 can also access or maintain historical data associated with previous deceleration operations, previous work cycles, and/or other machine operations performed by the machine 100 or other machines at locations on the worksite indicated by the location data 240. Such historical data can, for example, indicate that the machine 100 previously performed a braking operation during travel through a section of the worksite during a previous work cycle, and thus may be likely to perform a similar braking operation at the same section of the worksite during a subsequent work cycle.

Accordingly, if the location data 240 indicates that the machine 100 is at a particular location and is headed toward a downhill section, the braking operation determiner 234 can determine that the machine 100 is likely to begin performing a braking operation to control speed when the machine 100 reaches the downhill section. Similarly, if historical information indicates that the machine 100 previously performed a braking operation during a previous work cycle while traversing the downhill section, the braking operation determiner 234 can determine that the machine 100 is likely to perform a similar braking operation when the machine 100 reaches the downhill section during a current work cycle. The braking operation determiner 234 can accordingly use speed data 238 to determine a current speed of the machine 100 and estimate when the machine 100 will initiate the braking operation. The braking operation determiner 234 can also use the location data 240 and/or other data to determine or predict brake power associated with the upcoming braking operations.

In other examples, the controller 220 and/or speed controller 228 can use the location data 240, historical work cycle data, and/or other data to determine that the machine 100 should preemptively decelerate in advance of reaching an upcoming downhill section or other area, so that subsequent braking operations associated with the upcoming downhill section or other area are associated with a reduced amount of brake power. For example, the location data 240 can indicate that the machine 100 will reach a downhill section in 50 meters. The controller 220 and/or speed controller 228 can accordingly schedule or otherwise cause the machine 100 to perform preemptive braking operations to reduce the speed of the machine 100 while the machine 100 travels through those 50 meters. Additionally, in some examples, the feed forward controller 110 may be implemented in advance of reaching the location such that the load system 112 and/or auxiliary system 218 are prepared to receive power from the primary systems 216 as the motors of the machine 100 are used in conjunction with the brake systems 204 to slow the machine 100. Accordingly, rather than performing braking operations associated with a relatively high amount of brake power once the machine 100 reaches the downhill section, the already-slowed machine can decelerate or maintain a slower speed using braking operations associated with lower amounts of brake power once the machine 100 reaches the downhill section. Such a lower amount of brake power may be more likely to lead to a higher percentage of captured energy being stored and re-used by systems such as the battery system 214 and/or auxiliary systems 218, instead of that energy being lost or wasted as heat.

In some examples, the controller 220 and/or speed controller 228 can use the location data 240, historical work cycle data, and/or other data to determine that a brake operation performed by the machine 100 at a particular worksite location during a previous work cycle caused more energy to be captured than could be stored and re-used by systems of the machine 100. Accordingly, the controller 220 and/or speed controller 228 can determine that, during a subsequent work cycle, the machine 100 should travel at a slower speed before reaching that particular worksite location, perform a braking operation with a lower deceleration rate over a longer distance, or otherwise adjust machine operations in order to perform a braking operation with a lower amount of brake power in association with the particular worksite location. By adjusting operations of the machine 100 during a current work cycle to lower brake power associated with an upcoming braking operation, based on historical brake power levels associated with prior braking operations performed during previous work cycles, the adjustments to the operations of the machine 100 can lead to a higher percentage of captured energy being stored and re-used by systems of the machine 100 during the current work cycle.

In some examples, the controller 220 and/or speed controller 228 can use a machine learning model, trained on a training data set indicating how adjustments to machine operations changed brake power levels associated with braking operations, to determine which adjustments to operations of the machine 100 are likely to increase amounts of captured energy being stored and re-used by systems of the machine 100. In some examples, the machine learning model can be trained by an off-board computing system, and the trained machine learning model can be provided to the controller 220 and/or the speed controller 228. The machine learning model can be based on convolutional neural networks, recurrent neural networks, other types of neural networks, nearest-neighbor algorithms, regression analysis. Gradient Boosted Machines (GBMs), Random Forest algorithms, deep learning algorithms, and/or other types of artificial intelligence or machine learning framework. The machine learning model can be trained using a supervised or unsupervised machine learning approach, for instance based on the training data set.

Overall, the braking operation determiner 234 can determine that the machine 100 is to perform a braking operation based on input 236, information in speed data 238 provided by the speed controller 228 (such as a current speed, speed limits 242, automatic braking commands, and/or other speed data), the location data 240, historical work cycle information, and/or other information. As described further the below, controller 220 can implement the braking operation in part by determining which systems of the machine 100 to invoke during the braking operation, such as to implement a feed forward control, and select from among various brake systems including motor torques, regenerative braking, and other braking systems of the machine 100.

When the braking operation determiner 234 identifies a braking operation, the braking operation determiner 234 can also determine an amount of brake power associated with the braking operation. For example, based on a current speed of the machine 100, a deceleration rate and/or requested speed indicated by the input 236 and/or the speed data 238, incline or decline angles of terrain detected by the machine 100 or determined based on the location data 240, a weight of the machine 100 and/or a payload carried by the machine 100, attributes of the brake systems 204, historical data indicating amount of brake power generated by similar braking operations during previous work cycles, and/or other factors, the braking operation determiner 234 can determine an amount of brake power associated with the braking operation.

The amount of brake power associated with the braking operation can be associated with an amount of torque associated with implementation of the braking operation by one or more of the primary systems 216 and/or one or more of the brake systems 204. In some examples, the amount of brake power associated with the braking operation can correspond with an amount of kinetic energy and/or potential energy that could potentially be captured by the regenerative brake system 206 and/or the resistive brake system 208 during implementation of the braking operation. However, as discussed further below, the amount of energy associated with the brake power of the braking operation can, in some situations, exceed capacities of the regenerative brake system 206 and/or the resistive brake system 208 to capture and/or use the energy.

As a non-limiting example, a request to brake quickly at a relatively high deceleration rate can be associated with a higher amount of torque, and thus a relatively high amount of energy that could potentially be captured by the motor and/or regenerative brake system 206. Another request to change from a current speed to slightly slower speed, or to maintain a current speed, can be associated with a lower amount of torque, and thus a lower amount of energy that could potentially be captured by the motor and/or regenerative brake system 206.

In addition to using input 236, speed data 238, and/or other data to identify a braking operation and to determine an amount of brake power associated with the braking operation, the controller 220 can use feedback data to determine current usage levels, currently-available capacities, and/or other attributes of the brake systems 204, the battery system 214, and the auxiliary systems 218. The controller 220 can accordingly determine which of the systems of the machine 100 to invoke during a braking operation based in part on the charging current limit, current usage levels, currently-available capacities, and/or other attributes of such systems.

The controller 220 may use the input 236 to anticipate a braking operation, for example when the input 236 indicates a directional change and/or includes information from the location data 240 to slow the machine 100 using the motor and/or brake systems 204.

In some examples, the controller 220 can be configured to avoid using certain auxiliary systems 218 and/or load system 112 as parasitic systems based on environmental factors or other factors. In some examples, some parasitic systems can be used in combination. For instance, the controller 220 can turn on a battery heating system and a battery cooling system of the machine 100 simultaneously to increase energy consumption, and to heat and cool the battery system 214 simultaneously without moving a temperature of the battery system 214 outside an operating range.

As discussed above, the controller 220 can determine which systems of the machine 100, such as which of the brake systems 204, load system 112 and auxiliary systems 218, to invoke during a braking operation, based at least in part on an amount of brake power associated with the braking operation. The controller 220 can have a system selector 244 configured to select one or more specific systems to invoke for a braking operation, based on feedback indicating usage levels and/or available capacities of the systems and based on system priority data 246. The system selector 244 may be used to implement a feed forward control for the selected systems, such that the systems are prepared to receive energy from the motor and/or regenerative brake system 206.

The system priority data 246 can indicate a priority order of various systems of the machine 100, including one or more of the load system 112 (e.g., a parasitic load system), brake systems 204, the battery system 214, and/or the auxiliary systems 218. For example, the system selector 244 can prioritize selecting and invoking a highest-priority system indicated by the system priority data 246 to receive energy associated with brake power of a braking operation. If the amount of energy associated with brake power of a braking operation is above a currently available capacity of the highest-priority system to receive energy, the system selector 244 can invoke the highest-priority system as well as one or more additional systems in an order indicated by the system priority data 246. For instance, the system selector 244 can allocate energy associated with brake power of a braking operation to one or more high-priority systems, up to the currently available capacity of those high-priority systems to receive energy, and allocate the remainder of the energy associated with the brake power of the braking operation to the next-highest-priority system that has a currently available capacity sufficient to receive the remaining energy.

Overall, the system priority data 246 can indicate that one or more systems of the machine 100 that are configured to capture, store, and/or re-use captured energy associated with brake power are the highest priorities. The system priority data 246 can indicate that other systems of the machine 100 that are not configured to re-use captured energy associated with brake power are lower priorities. In some examples, the system priority data 246 can rank such lower-priority systems in order to minimize usage of certain lower-priority systems that may be more at risk of damage and/or a reduction in remaining usable life when the lower-priority systems are used.

As a non-limiting example, the system priority data 246 can indicate that use of the regenerative brake system 206 to charge the battery system 214 and/or power currently-active auxiliary systems 218 has the highest priority, that use of the resistive brake system 206 has second highest priority, that use of additional auxiliary systems 218 has the third highest priority, and that use of the mechanical brake system 210 has the lowest priority. Accordingly, in this example, the system selector 244 can prioritize using the highest-priority regenerative brake system 206 to charge the battery system 214 and/or power currently-active auxiliary systems 218, so that energy associated with a braking operation can be captured, stored, and/or re-used by the machine 100.

In some examples, the controller 220 can also have a notification manager 248 configured to display notifications to a driver or other operator of the machine 100 via the user interface 230 in response to defined conditions. The user interface 230 can be a display screen, indicator lights, dashboard indicators, and/or user-perceptible elements. The notifications may indicate that one or more lower-priority systems are being invoked for a braking operation, and/or suggest actions to reduce the likelihood of such lower-priority systems being invoked for future braking operations.

Although the notification manager 248 can cause display of notifications to a driver of the machine 100 as discussed above, the notification manager 248 can also, or alternately, cause similar notifications or information to be transmitted to an off-board computing system. For example, the notification manager 248 can transmit information to a fleet manager, worksite controller, or other off-board computing system indicating how much energy captured during braking operations of the machine 100 is being allocated to systems that can store or re-use the captured energy, and how much of the energy is being allocated to other lower-priority systems. The off-board computing system can use such information to determine and/or monitor energy recovery performance metrics associated with individual machines, a fleet of machines, and/or machine operators. Accordingly, if such metrics indicate that a particular machine operator has relatively low energy recovery performance metrics, a fleet owner may provide that machine operator with feedback or training that may increase the machine operator's energy recovery performance metrics over time.

Overall, the controller 220 can use input 236 and/or speed data 238 to identify a braking operation of the machine 100 that is occurring, or is likely to occur. The controller 220 can activate a feed forward control system for one or more dissipative and/or storage systems to startup as a function of the charging current limit of the battery system 106. The controller 220 can also determine an amount of brake power associated with the braking operation, and can use feedback data to determine current, usage levels and/or currently-available capacities of a set of systems that are prioritized according to the system priority data 246. The controller 220 can also determine whether to provide energy associated with the brake power to one or more higher-priority systems during the braking operation, up to currently-available capacities of those higher-priority systems to consume energy, and can determine whether to provide any excess energy to a lower-priority system. Accordingly, energy associated with brake power can be most often provided to higher-priority systems during braking operations, and usage of lower-priority systems can be reduced during braking operations.

Figure 3:
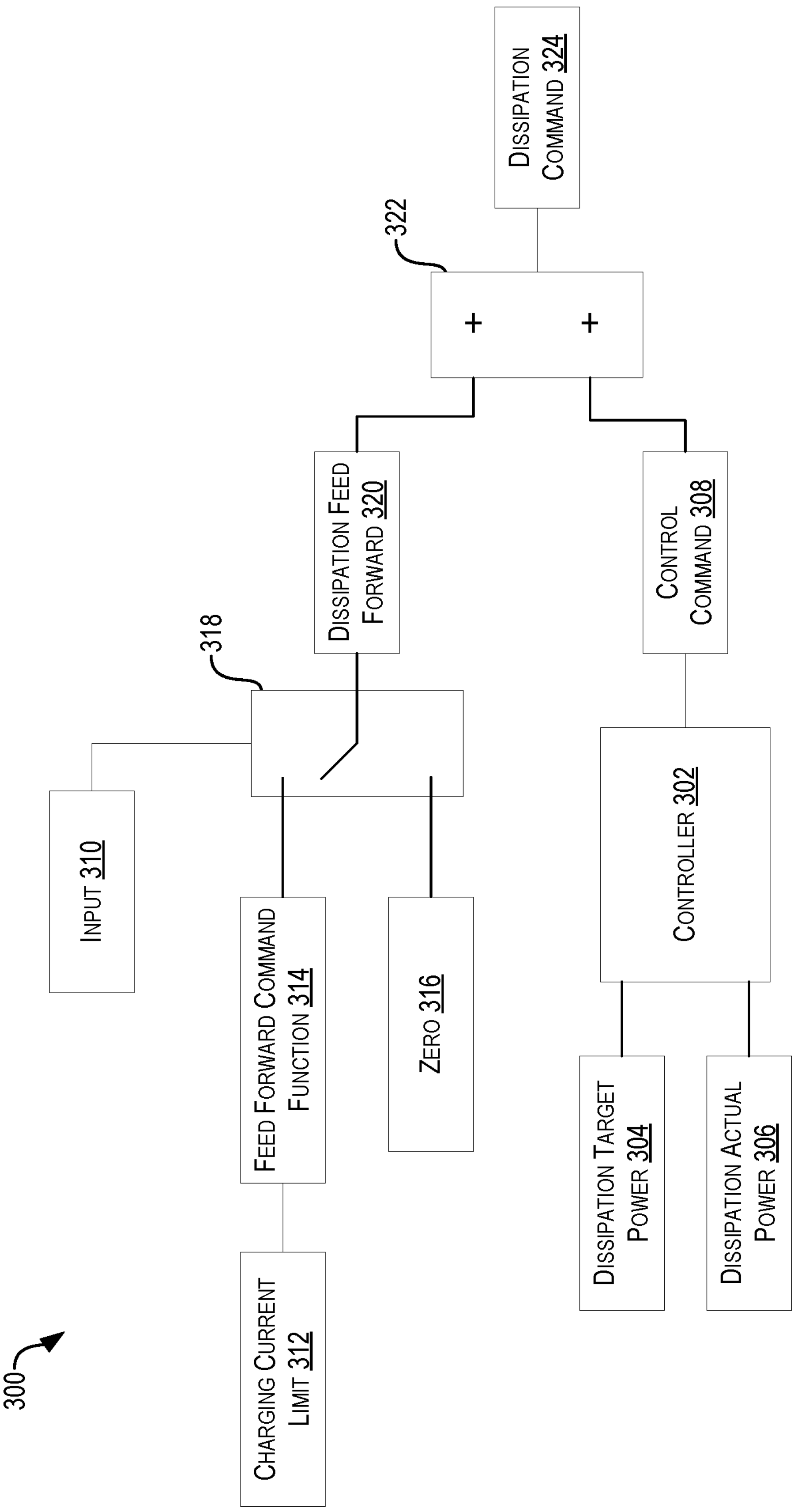
FIG. 3 illustrates an example control system for a feed forward controller to engage a dissipation system for a machine during deceleration, according to at least one example.

FIG. 3 illustrates an example control system 300 for a dissipation system of a machine during deceleration, according to at least one example. The control system 300 includes a controller 302 for controlling an operation of a dissipation and/or storage system of a machine 100. The dissipation and/or storage system may include a system for storing kinetic and/or potential energy. The dissipation and/or storage system may include a parasitic load or system for dissipating energy, such as the load system 112 described herein.

The controller 302 may include the controller 220 of FIG. 2 or other such system for controlling operation of an auxiliary system of the machine 100. The controller 302 may include a PID controller or other such controller system. The controller 302 may include other types of controller systems that may be used to control a dissipation and/or energy storage system based on a dissipation target power 304 signal and a dissipation actual power 306 signal. The controller 302 may control the dissipation system to cause the dissipation actual power 306 that corresponds to the power consumed by the dissipative and/or auxiliary system to reach and/or match the dissipation target power 304.

The output of the controller 302 may include the control command 308 that is used to control the dissipative system (e.g., as part of the dissipation command 324). The controller 302 may be supplemented by a feed forward controller. The feed forward control system includes a feed forward command function 314 that produces a dissipation feed forward 320 signal. The feed forward command function 314 produces the dissipation feed forward 320 in response to the charging current limit 312. The feed forward command function 314 may be inversely proportional to the charging current limit 312 of the battery system of the machine 100, as described herein.

The feed forward command function 314 produces the dissipation feed forward 320 signal through a switch 318 that is used to activate and deactivate the feed forward command function 314. The switch 318 may be selectively actuated based on an input 310. The input 310 may include an input indicating a directional change, deceleration request, grade sensor data, or other input 310 indicative of a request for deceleration of the machine 100. For instance, when an input from a user indicated a directional change for the machine 100, the switch 318 may switch from zero 316 to the feed forward command function 314 to engage the feed forward control system. In this manner, the switch 318 engages the feed forward command function 314 for control of the dissipative system. The feed forward command function 314 may then produce the dissipation feed forward 320 signal as a function of the charging current limit 312. The dissipation feed forward 320 signal and the control command 308 may be summed together at a sum 322 to produce a combined control signal, referred to as the dissipation command 324. The dissipation command 324 may be used to control the dissipative system of the machine 100. The feed forward command function 314 provides for the dissipative system to be engaged based on the charging current limit 312 and prevent a delay in engaging the secondary system.

Figure 4:
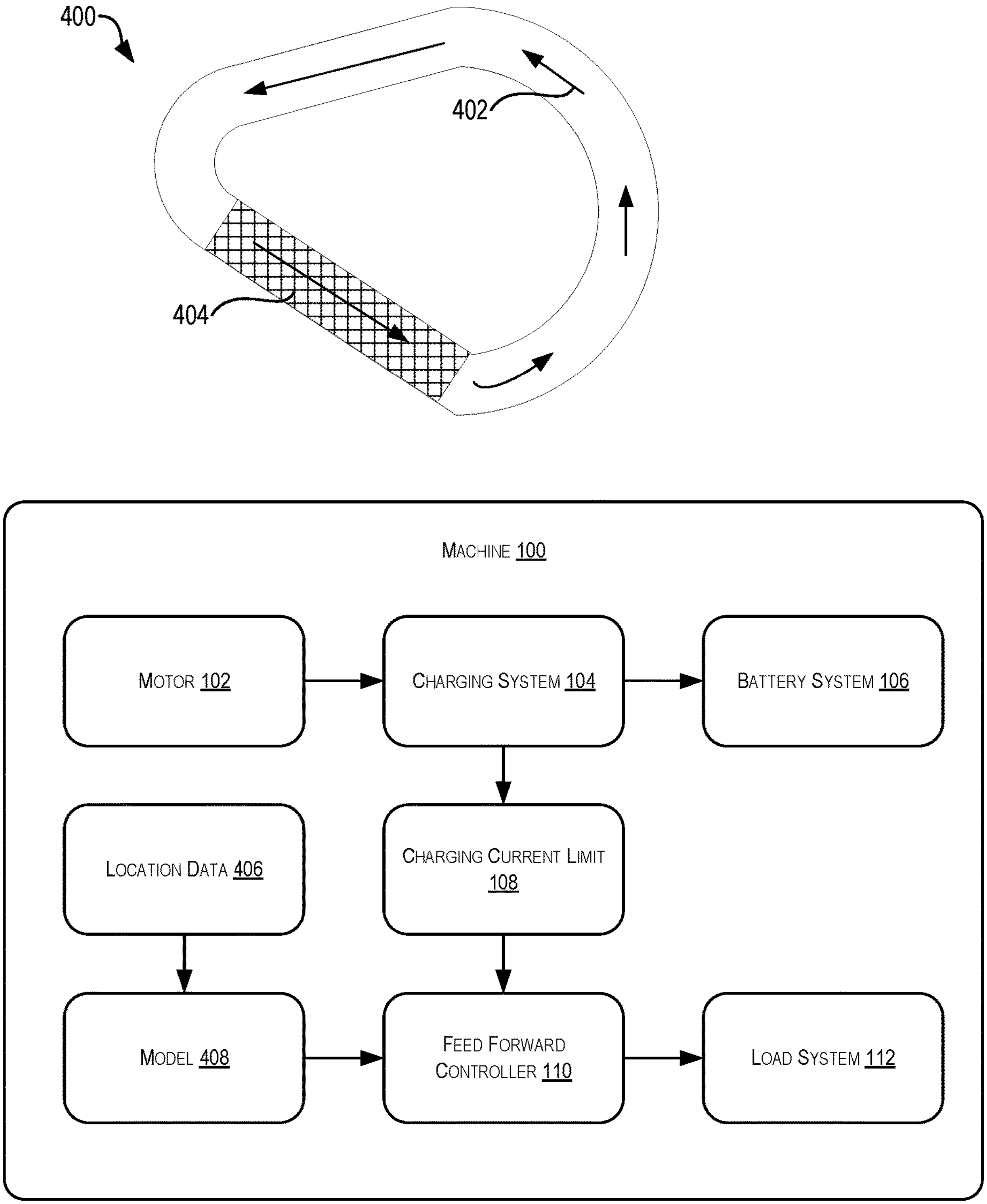
FIG. 4 illustrates an example of a geographically-engaged control system for a dissipation system of a machine during deceleration, according to at least one example.

FIG. 4 illustrates an example 400 of a geographically-engaged control system for a dissipation system of a machine 100 during deceleration, according to at least one example. The machine 100 includes the motor 102, charging system 104, battery system 106, charging current limit 108, feed forward controller 110, and load system 112 as described with respect to FIG. 1.

The example 400 further includes location data 406 and a model 408 used for engaging a dissipative system (such as the load system 112) for the machine 100 to prevent a delay in bringing the load system 112 online to dissipate the energy produced by a motor 102 and/or a regenerative braking system of the machine 100.

In an example worksite, the machine 100 may be controlled to drive a loop or circuit in a first direction 402. The circuit may be repeated by the machine 100 during a work shift. The circuit may include a downhill portion 404 that the machine 100 traverses as it completes the loop. On the downhill portion 404, the machine 100 may typically accelerate down the hill. The machine 100 may engage motor braking and/or braking systems to prevent acceleration down the downhill portion 404. The location data 406, such as described with respect to FIG. 2, may include site data such as the gradient of the downhill portion 404 as well as a current location of the machine 100. Therefore, as the machine 100 approaches and/or reaches the downhill portion, the feed forward controller 110 may be engaged to cause the load system 112 to be brought online to prepare for energy dissipation as a function of the charging current limit 108.

Figure 5:
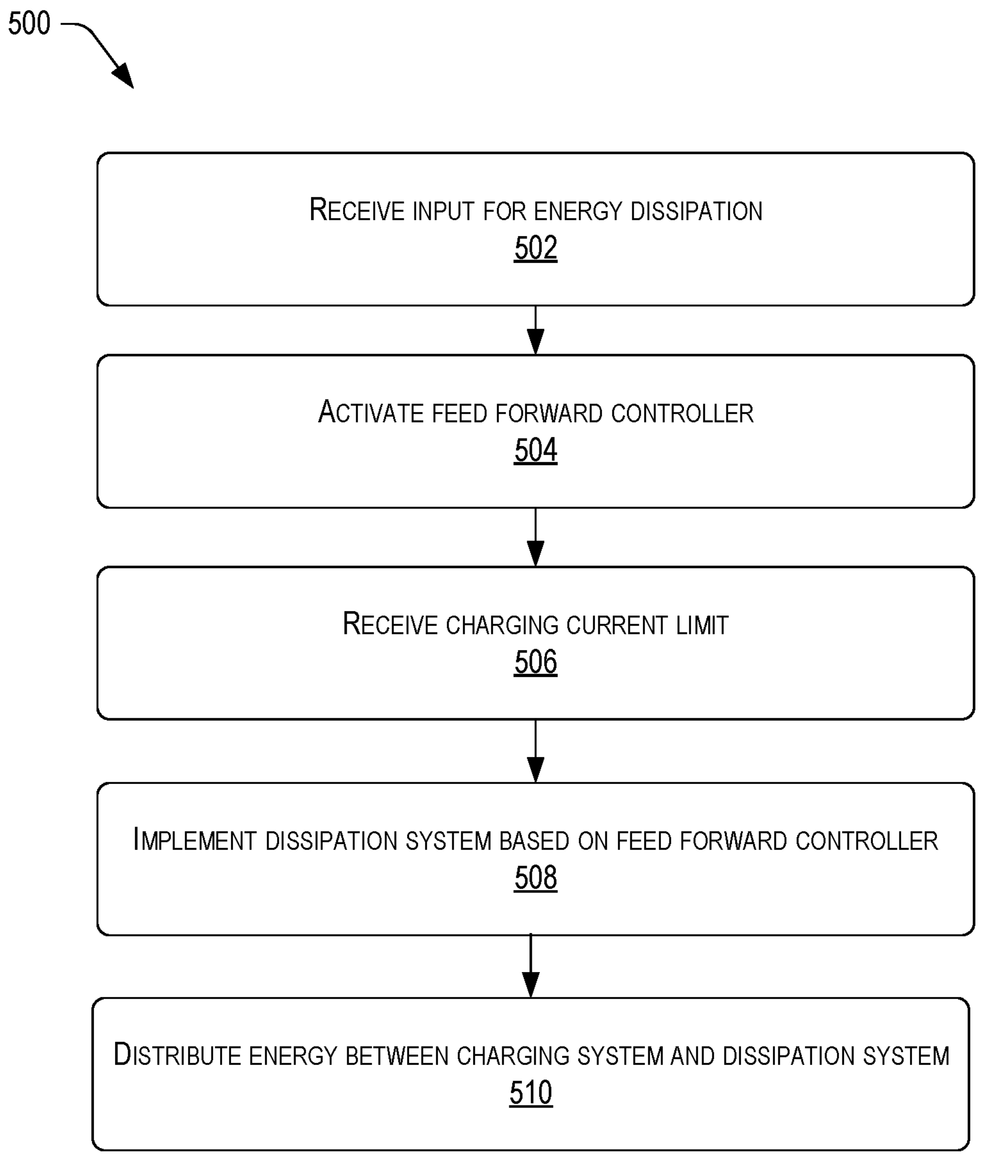
FIG. 5 illustrates a method for controlling and engaging operation of a load system on a machine during machine deceleration, according to at least one example.

FIG. 5 illustrates a method 500 for controlling and engaging operation of a load system on a machine during machine deceleration, according to at least one example. The method 500 may be carried out by a controller of a machine 100 such as the controller 220. The method 500 includes receiving an input for energy dissipation at step 502 as a result of deceleration of a machine 100. The energy dissipation may be requested for decelerating the machine 100 using a motor to produce a current to provide motor braking for the machine 100 The input may be received as part of a request for a directional change, reduce acceleration on a downhill grade, and/or reduce speed of the machine 100.

The method 500 includes activating a feed forward controller at step 504. The feed forward controller may be activated by switching a switch that connects the feed forward controller to a controller (e.g., a PID controller) for the dissipative system. The feed forward controller may be configured to provide a command function as a function of a current charging limit for a battery system. The feed forward system may be inversely proportional to the charging current limit.

The method 500 includes receiving a charging current limit at step 506. The charging current limit may be received from a battery system and/or charging system of the machine 100. The charging current limit may be determined by a controller of the battery system based at least in part on the state of charge, battery health, temperature, and other such data related to the battery system.

The method 500 includes implementing a dissipation system of the machine 100 based on the feed forward controller at step 508. The dissipation system may include a pump, heat system, electrical system, or other such dissipative and/or energy storage system of the machine 100. The dissipative system may be activated based on a control signal from the feed forward controller and/or the controller of the machine 100. The dissipative system may be implemented based on a combined command signal from the feed forward controller as well as the controller of the machine 100.

The method 500 further includes distributing energy between the charging system and the dissipation system as a result of the combined control signal at step 510. The energy produced by a motor of the machine 100 and/or a regenerative braking system may be distributed to a charging system to charge the battery of the machine 100 and to dissipate the energy at the dissipative system. The share of the energy provided to the charging system may be determined by a controller of the machine and the amount provided to the dissipative system may be determined based on the feed forward control system as well as the controller of the machine 100.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features, it is to be understood that the subject matter defined in the appended claims is not necessarily limited to the specific features described. Rather, the specific features are disclosed as illustrative forms of implementing the claims.

INDUSTRIAL APPLICABILITY

The present disclosure provides systems and methods for operation of an electric drive work machine and more particularly for a braking operation (e.g., deceleration) that applies braking torque to slow the speed of the machine from a current speed to a lower speed, and/or to stop the machine. In other examples, the braking operation can be a retarding operation that applies braking torque to maintain a current speed of the machine. For instance, if the machine is traveling downhill and might otherwise accelerate downhill, the motor can operate to prevent acceleration and thereby maintain the current speed of the machine. In some examples, the battery system may not be able to accept current from the motor as the motor is used to produce power to slow the machine on the grade.

In some examples, the machine performs a directional change when a user requests a change from a first direction to a second direction while traveling at high speed in the first direction. To execute a directional change the powertrain of the machine must first decelerate the machine to zero speed in the first direction by reducing the machine's kinetic energy, either via energy dissipation through mechanisms such as brakes and hydraulic retarders or through energy transfer to energy storage devices such as flywheels or batteries. The machine may have a minimum rate of power transfer/dissipation. In an electric drive work machine, the rate of power transfer may depend upon the charging current rate limit of the system. As used herein, brakes may refer to regenerative brake systems, resistive brake systems, motor torques used for braking, mechanical brake systems, and other such braking systems.

As the state of charge (SOC) of the battery system increases, the charging current limit decreases, requiring the activation of retarding devices mid-deceleration to maintain a consistent magnitude of retarding force (deceleration) felt by the operator. In some examples other factors may affect the charging current limit such as the battery temperature, ambient temperature, and other such factors.

In either example, preventing acceleration down a grade or slowing the machine from a speed in a first direction to zero, or other examples where deceleration of the machine is desired, typical mechanical dissipation (e.g., retarding) devices, referred to herein as load system, may have long response times to generate the required level of energy dissipation, creating a delay or interruption in the retarding force that results in an inconsistent deceleration and/or directional change experience for the operator.

Accordingly, the system and method described herein provides for energy storage at the battery system when performing deceleration and/or a directional change as well as dissipation or secondary storage devices without resulting in delays for secondary systems to activate. This also ensures that the current charging limit isn't exceeded, preventing overheating and potential damage to the charging system and/or battery system.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. An electric drive work machine comprising:

an electric motor;

an energy storage device configured to provide power to the electric motor;

a load system configured to receive power produced by the electric motor;

a sensor system; and a controller comprising a processor and a non-transitory computer-readable medium having instructions stored thereon that, when executed by the processor, cause the processor to perform operations comprising:

determining, based on sensor data from the sensor system, to decelerate the electric drive work machine using the electric motor;

determining a charging current limit for the energy storage device; and activating a feed forward signal in response to determining to decelerate the electric drive work machine, wherein:

the feed forward signal is based on the charging current limit and pre-activates the load system prior to the load system being required to dissipate energy from the electric motor in response to decelerating the electric drive work machine;

the feed forward signal is configured to control, at least in part, operation of the load system; and activating the feed forward signal causes the load system to begin receiving energy from the electric motor before the charging current limit of the energy storage device is reached during deceleration.

2. The electric drive work machine of claim 1, wherein the sensor system comprises a sensor configured to detect a user input associated with a directional change of the electric drive work machine.

3. The electric drive work machine of claim 1, wherein the sensor system comprises a grade sensor configured to detect a grade traversed by the electric drive work machine.

4. The electric drive work machine of claim 1, wherein the controller comprises a Proportional-Integral-Derivative ("PID controller") configured to operate the load system for dissipation or storage of energy produced by the electric motor during deceleration, and wherein the feed forward signal is added to an output control signal of the PID controller.

5. The electric drive work machine of claim 1, wherein the sensor system comprises map data of a worksite and location data of the electric drive work machine, and wherein determining to decelerate is based at least in part on the map data and the location data.

6. The electric drive work machine of claim 1, wherein the feed forward signal is a function of the charging current limit of the energy storage device.

7. The electric drive work machine of claim 1, wherein the load system comprises at least one of a fluid pump, hydraulic pump, secondary energy storage system, or dissipative energy system.

8. The electric drive work machine of claim 1, wherein the operations further comprise:

controlling, using a feedback control loop, the load system based on a target power and an actual power of the load system;

adding the feed forward signal to an output of the feedback control loop to produce a combined control signal; and controlling the load system based on the combined control signal.

9. A method for controlling a work machine comprising:

determining, based on sensor data from a sensor system, to decelerate the work machine using an electric motor of the work machine;

controlling, using a control loop, a load system to dissipate or store at least a portion of energy produced by the electric motor during deceleration;

determining a charging current limit for a battery of the work machine; and activating a feed forward signal in response the determining to decelerate the work machine, wherein:

the feed forward signal is based on the charging current limit and pre-activates the load system prior to the load system being required to dissipate energy from the electric motor in response to decelerating the work machine; and activating the feed forward signal causes the load system to begin receiving energy from the electric motor before the charging current limit of the battery is reached during deceleration.

10. The method of claim 9, wherein the control loop comprises a Proportional-Integral-Derivative ("PID controller") configured to control, at least in part, operation of the load system.

11. The method of claim 10, wherein the feed forward signal is summed with an output of the PID controller to produce a combined control signal, and wherein the combined control signal is configured to control operation of the load system.

12. The method of claim 9, wherein the feed forward signal is inversely proportional to the charging current limit.

13. The method of claim 9, wherein the sensor system comprises a sensor configured to detect a user input associated with a directional change of the work machine.

14. The method of claim 9, wherein the sensor system comprises a grade sensor configured to detect a grade traversed by the work machine.

15. The method of claim 9, wherein the load system comprises at least one of a fluid pump, hydraulic pump, secondary energy storage system, or dissipative energy system.

16. A controller for a work machine comprising:

a first control system configured to control operation of a load system of the work machine in response to a first signal indicative of a target power distributed to the load system, the load system configured to dissipate or store energy produced by an electric motor of the work machine during deceleration;

a second control system comprising a feed forward function configured to output a second signal for control of the load system in addition to the first signal, wherein the feed forward signal pre-activates the load system prior to the load system being required to dissipate energy from the electric motor in response to decelerating the work machine and wherein the second signal is based on a charging current limit of an energy storage device of the work machine such that the load system is pre-activated to receive excess energy that cannot be absorbed by the energy storage device within the charging current limit;

a switch configured to selectively activate and deactivate the second control system in response to an input; and a summing component configured to sum the first signal the second signal and produce a combined signal for control of the load system.

17. The controller of claim 16, wherein the first control system comprises a Proportional-Integral-Derivative ("PID controller") configured to control, at least in part, operation of the load system.

18. The controller of claim 16, wherein the input to the switch comprises sensor data from a sensor system configured to detect a user input associated with a directional change of the work machine.

19. The controller of claim 16, wherein the input to the switch comprises grade data from a grade sensor configured to detect a grade traversed by the work machine.

20. The controller of claim 16, wherein the input to the switch comprises an output of a location model comprising map data for a worksite and location data for the work machine.

* * * * *